United States Patent [19]
O'Connor

[11] Patent Number: 5,671,965
[45] Date of Patent: Sep. 30, 1997

[54] TUMBLE SEAT WITH DISPLACEABLE SIDE HANDLE RELEASE

[75] Inventor: James G. O'Connor, Lake Orion, Mich.

[73] Assignee: Atoma International, Inc., Newmarket, Canada

[21] Appl. No.: 621,684

[22] Filed: Mar. 26, 1996

[51] Int. Cl.$^6$ ........................................... B60N 2/04
[52] U.S. Cl. ................ 296/65.1; 248/503.1; 297/326; 297/336
[58] Field of Search .................. 296/65.1; 297/325, 297/326, 331, 335, 336; 248/503.1

[56] References Cited

U.S. PATENT DOCUMENTS

| | | | |
|---|---|---|---|
| 4,700,989 | 10/1987 | Ercilla | 297/331 |
| 5,393,116 | 2/1995 | Bolsworth et al. | 296/65.1 |

*Primary Examiner*—David M. Mitchell
*Assistant Examiner*—Kia M. Robinson
*Attorney, Agent, or Firm*—Cushman Darby & Cushman IP Group of Pillsbury Madison & Sutro LLP

[57] ABSTRACT

A vehicle seat is provided for use in a vehicle including floor means having a pair of front and rear wells and anchor members extending across the wells. The seat is movable between a fixed, operative position and forwardly tumbled, storage position. Handle structure is coupled to at least one of the rear legs in a position to be manually grasped and operated at a side of the vehicle seat for unlatching the rear hook members thereby permitting the vehicle seat to be pivoted about the front anchor members and moved to the forwardly tumbled, storage position thereof. The handle structure includes a lost-motion connection constructed and arranged such that when the rear legs move toward the forwardly folded position thereof causing a portion of the handle structure to contact a surface of an associated rigid support which would otherwise restrict movement of the rear legs, the lost-motion connection permits the handle structure to move, enabling the rear legs to complete movement to the forwardly folded position thereof.

12 Claims, 5 Drawing Sheets

TUMBLE SEAT WITH DISPLACEABLE SIDE HANDLE RELEASE

BACKGROUND OF THE INVENTION

This invention relates to vehicle seats and, in particular, to a vehicle seat that can be tumbled forwardly to a storage position while remaining mounted on its supporting frame at a front portion thereof so as to generate a space behind the forwardly tumbled seat.

Conventional vehicle seats include a seat cushion mounted to a frame structure which provides the proper seat cushion height for optimal occupant comfort. The frame structure for such seats provides a method of retaining the seat to the vehicle floor by means of latches. Removal of the seat is achieved by unlatching the seat from the floor and then lifting and carrying the seat out of the vehicle to a place of storage. Instead of completely removing the vehicle seat, seating arrangements have been provided so that the latches on the rear legs of the seat may be unlocked while the latches on the front legs of the seat remain latched with anchor members or mounting pins disposed in the floor of the vehicle. Once the rear latches are unlocked, the seat may be flipped or tumbled forwardly for storage in an upright or generally vertical position. To remove the seat entirely from the vehicle, the front latches may be released and the seat may be lifted from the vehicle. The rear latches are generally released from engagement with the rear mounting pins by actuating a lift bar which is connected between the rear latches disposed on each side of the seat. Thus, when the bar is actuated, the rear latches are released from their engagement with the mounting pins so that the seat may be tumbled forwardly about the axis of the front mounting pins, with the rear legs folding forwardly up alongside a portion of the frame structure.

When the vehicle seat is utilized in a van or the like, it is desirable to be able to release the rear portion of the seat at a position at the side of the seat rather than having to reach back behind the seat to actuate the bar. To accomplish this, a handle has been placed at the end of the bar to extend outwardly from the side of the frame structure. Actuation of the handle will thus actuate the bar. However, the positioning of the handle within the physical requirements of the seat is not a simple matter. Specifically, when the handle is attached to extend outwardly of a side of the frame structure and associated with at least one rear leg, upon tumbling the seat, the handle may contact an upper surface of the frame structure preventing further movement or pivoting of the rear legs to their forwardly folded positions.

A need therefore exists to provide handle structure mounted with respect to a side of the vehicle seat which, when actuated, can release the latches from their locked positions so that the seat may be tumbled forwardly to its storage position, without the handle structure hindering movement of the rear legs to their forwardly folded positions alongside a portion of the frame structure.

An object of the present invention is to fulfill the above need. In accordance with the principles of the present invention, the objective is obtained by providing a vehicle seat for use in a vehicle including floor means having a pair of front and rear wells disposed with respect to a longitudinal axis of the vehicle and anchor members extending across the wells. The seat is constructed and arranged to be movable between a fixed, operative position for receiving a passenger thereon and forwardly tumbled, storage position. The vehicle seat includes a pair of rigid support structures disposed on opposite sides of the vehicle seat. A cushioned seat structure is provided on the pair of rigid support structures. Front and rear legs are mounted on each rigid support structure. Each of the legs includes a downwardly facing surface for engaging the anchor members, and associated front and rear hook members.

Each of the front and rear hook members is mounted for movement between (1) an operative position so as to enter the associated front and rear wells and engage in hooked relationship with the anchor members so as to detachably retain the rigid support structures and hence the cushion seat structure thereon in a fixed operative position on the floor means with the anchor members and the downwardly facing surfaces in engagement and (2) an inoperative position removed from engagement with the anchor members.

Each of the rear legs is pivotally coupled to an associated rigid support structure so as to be movable between (1) an operative position extending generally downwardly with respect to an associated rigid support structure permitting the rear hook members to be disposed in the operative position thereof, and (2) a forwardly folded position disposed generally adjacent an associated rigid support structure.

An actuating mechanism is operatively associated with the rear hook members and includes manually movable handle structure coupled to at least one of the rear legs in a position to be manually grasped and operated at a side of the vehicle seat. The handle structure is biased toward a use position by a spring. The actuating mechanism is constructed and arranged with respect to the rear hook members so that manual movement of the handle structure from the use position moves the rear hook members from the operative position thereof, to the inoperative position thereof thereby permitting the vehicle seat to be pivoted about the front anchor members and moved to the forwardly tumbled, storage position thereof.

The handle structure includes a lost-motion connection constructed and arranged such that when the rear legs move toward the forwardly folded position thereof causing a portion of the handle structure to contact a surface of an associated rigid support which would otherwise restrict movement of the rear legs, the lost-motion connection permits the handle structure to move against the bias thereon, enabling the rear legs to complete movement to the forwardly folded position thereof.

Another object of the present invention is the provision of a vehicle seat of the type described which is simple in construction, effective in operation and economical to manufacture and maintain.

These and other objects of the present invention will become apparent upon the course of the following detailed description and appended claims.

The invention may best be understood with reference to the accompanying drawings wherein an illustrative embodiment is shown.

DETAILED DESCRIPTION OF THE INVENTION

Figure 1:
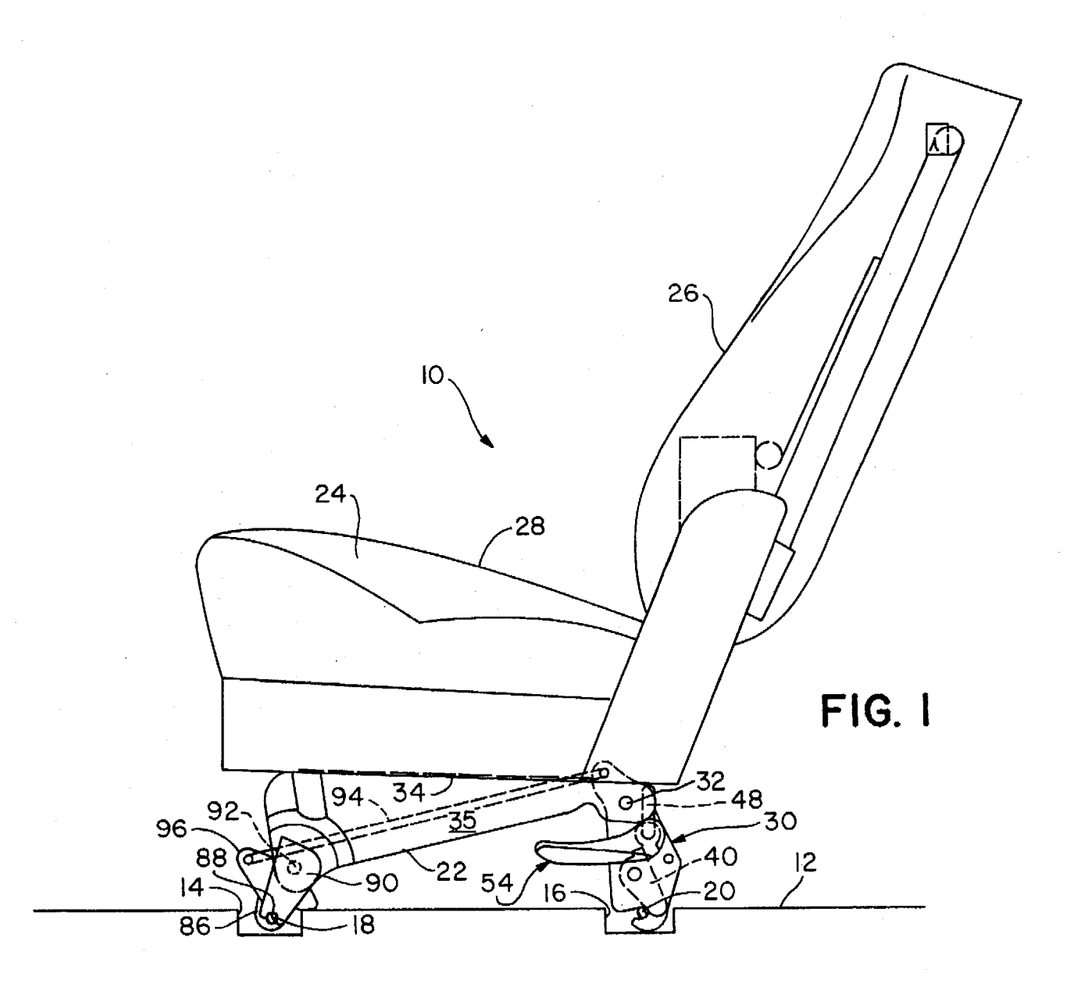
FIG. 1 is a schematic, left side view of a vehicle seat of the invention shown installed in a vehicle.

Referring to the drawings, in particular to FIG. 1, a vehicle seat, generally indicated at 10, is shown supported on a floor 12 of a vehicle. In the illustrated embodiment, the floor 12 includes a plurality of wells which are used to secure the seat 10 to the floor 12. With reference to FIG. 1, it can be appreciated that one vehicle seat requires four wells for mounting thereof, two front wells 14 and two rear wells 16, with respect to the longitudinal axis of the vehicle. One front well is disposed in front of one rear well. Each well has a bottom surface and side walls. The wells extend below the floor 12 of the vehicle. In addition, each front well 14 includes an anchor member 18 and each rear well includes an anchor member 20. The anchor members are disposed perpendicularly with respect to longitudinal axis of the vehicle and extend the width of each well. The anchor members 18 and 20 are fixedly mounted with respect to the vehicle floor 12.

The seat 10 includes a frame structure in the form of a pair of transversely spaced, risers or rigid support structures 22, 23 disposed on opposite sides of the vehicle seat 10. A seat cushion 24 and back cushion 26 are mounted on the rigid support structures. The seat cushion 24 and back cushion 26 constitute a cushioned seat structure. The back cushion 26 is pivotally mounted with respect to the seat cushion 24 in the conventional manner so that the back cushion 26 may be folded forwardly to rest on the seating surface 28 of the seat cushion 24 when the seat 10 is disposed in its storage position, as will be explained below.

Figure 3:
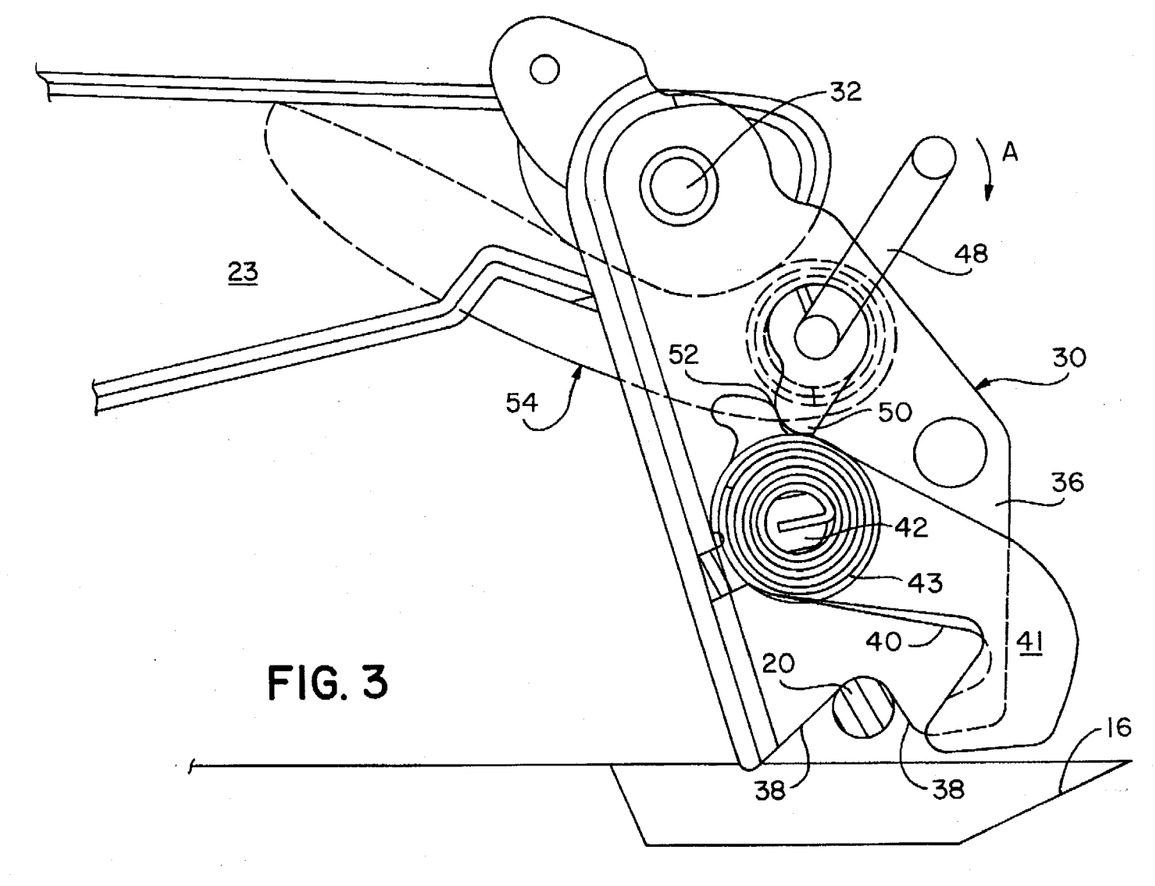
FIG. 3 is a view similar to FIG. 2 with certain parts omitted for clarity of illustration, showing the handle structure actuated moving a rear hook member from an operative position to an inoperative position, removed from engagement with the anchor member.
Figure 4:
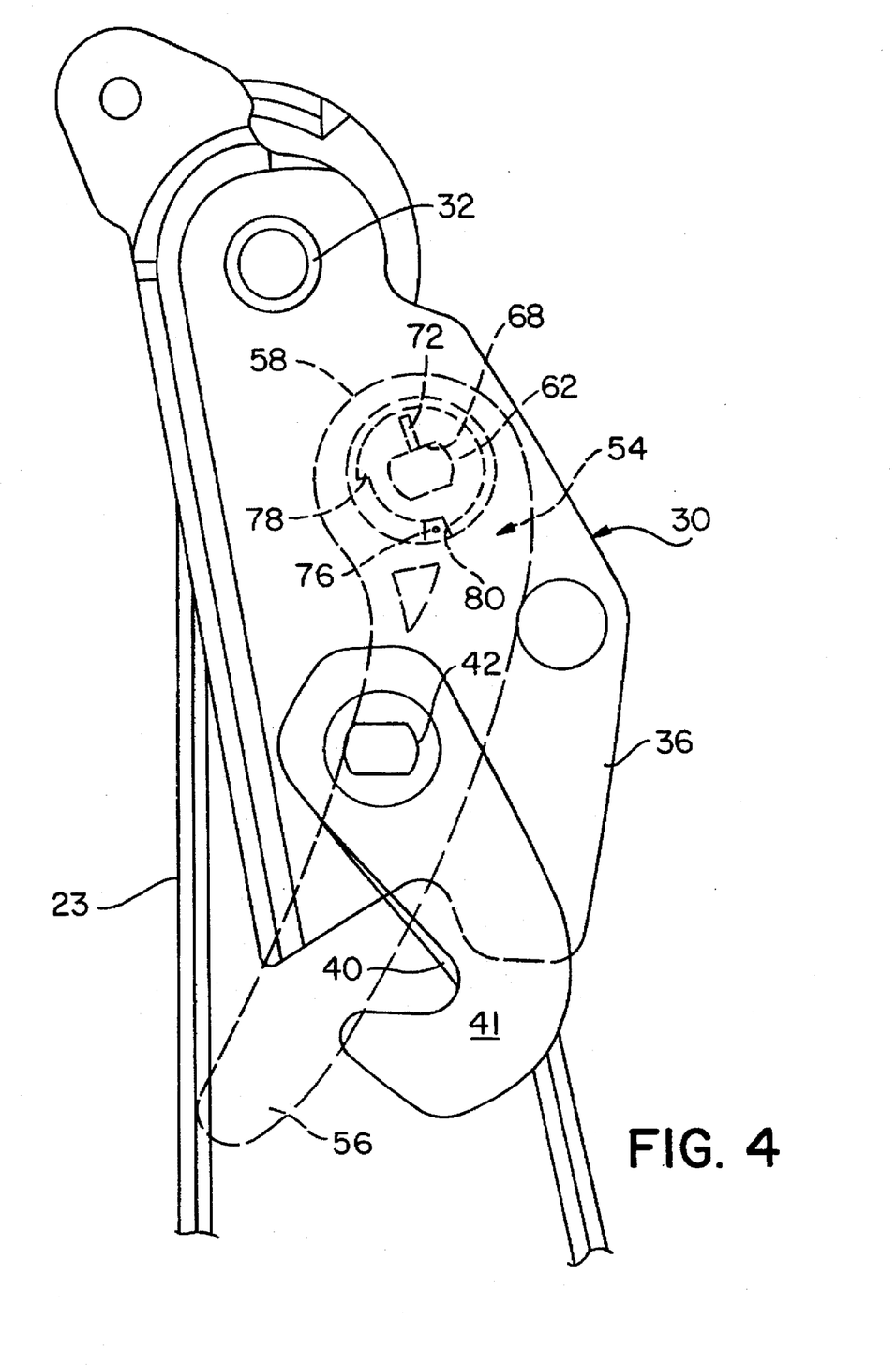
FIG. 4 is a view of the rear leg of FIG. 3, with certain parts omitted for clarity of illustration, shown in its forwardly folded position alongside the rigid support structure, when the vehicle seat is in its forwardly tumbled, storage position.

Each rigid support structure 22 and 23 includes front and rear legs mounted thereon. As shown in FIG. 1, each rear leg, generally indicated at 30, is pivotally coupled to an associated rigid support structure at pin 32 so as to be movable between an operative position extending generally downwardly with respect to a top surface 34 of an associated rigid support structure 23 (FIG. 2), and a forwardly folded position disposed generally adjacent the associated rigid support structure 23 (FIG. 4), the function of which will become apparent below. Each of the rear legs includes a support member 36 including notches defining downwardly facing surfaces 38 for engaging an anchor member 20 of a rear well 16. It can be appreciated that FIGS. 2–4 are views of the right rigid support structure 23 as viewed from the left side of the vehicle seat.

A rear hook member 40 is mounted with respect to each rear leg 30. As shown in FIG. 2, each rear hook member 40 is pivotally coupled to an associated support member 36 by rivet 42. In the illustrated embodiment, a latch plate 41, having a shape corresponding substantially to that of a rear hook member 40, is associated with each rear hook member 40. Each latch plate is also pivotally mounted with respect to an associated rear leg 40 via the rivet 42. The latch plates 41 are not required, but prevent rattle of the seat 10 when the seat is in the operative position thereof.

Thus, each rear hook member 40 and associated latch plate 41 is secured to an associated rear leg 30 so that the hook members 40 and latch plates 41 may rotate with respect to the rear legs 30 to latch and unlatch the rear legs from engagement with the anchor members 20 in the wells. A torsion spring 43 is mounted on the rivet 42 of each rear hook member 40 to bias the associated rear hook member 40 towards its operative position shown in FIG. 2. Further, an overhead spring 44 is coupled at one end to an end of a cross-tube 46, with the other end of the spring 44 being coupled to an associated latch plate 41. Thus, spring 44 biases each latch plate 41 towards the operative position thereof. Cross-tube 46 extends between the rigid support structures 22 and 23. In the illustrated embodiment, cross-tube 46 is integral with the support members 36.

Figure 2:
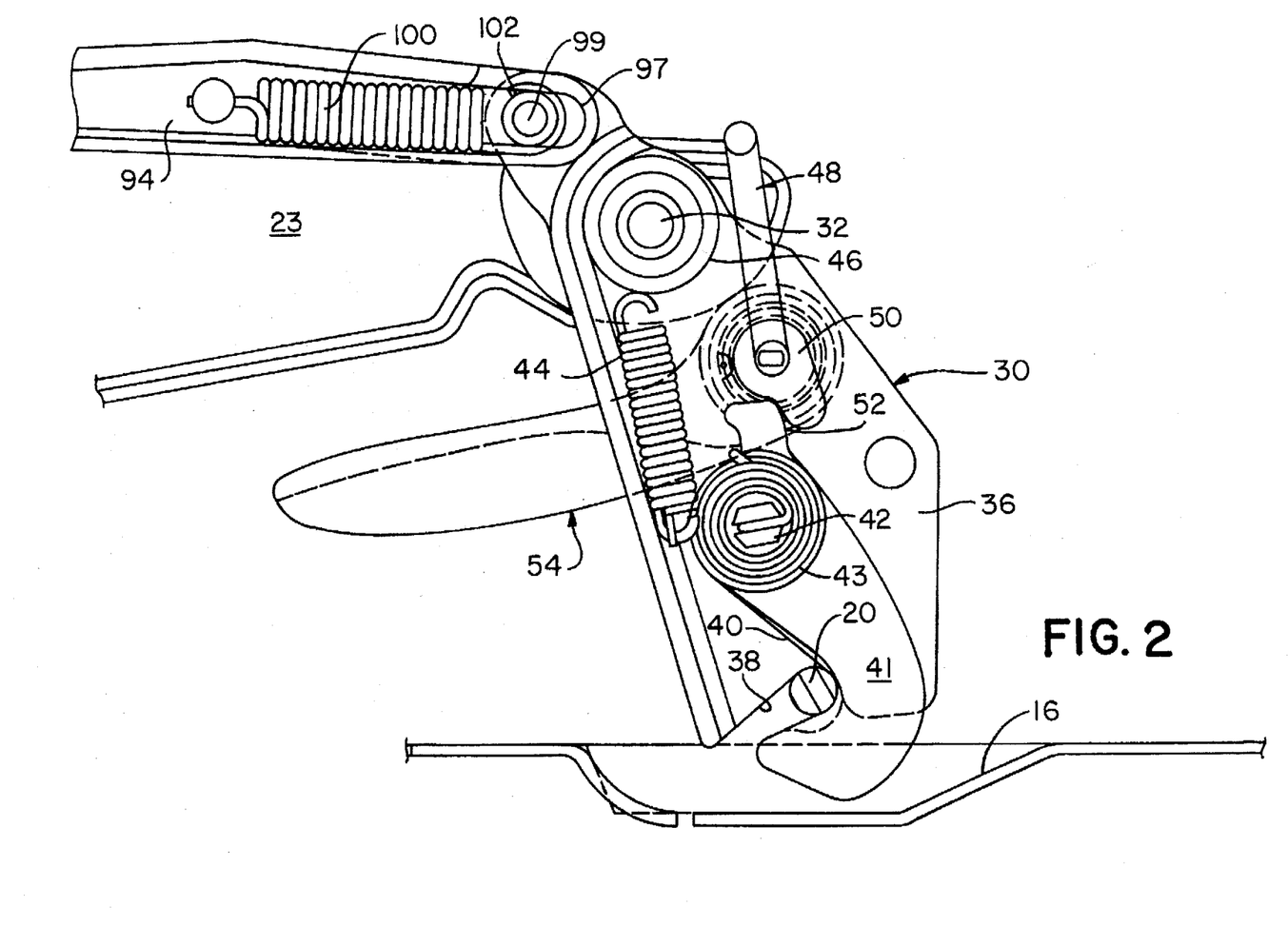
FIG. 2 is an enlarged side view of a right side, rear leg of the vehicle seat of the invention as viewed from the left side of the vehicle seat, shown in an operative position with a rear hook member thereof engaged with an anchor member of the floor and with handle structure disposed in a use position.

As shown in FIG. 2, in a conventional manner, the rear hook members 40 are operated by an actuating mechanism in the form of a rear, rod-shaped lift handle 48 that is disposed between the rigid support structures 22 and 23 and pivotally mounted with respect thereto. The lift handle 48 has a cam 50 fixed to each end thereof which cooperates with a cam surface 52 of each rear hook member 40. With reference to FIG. 3, it can be appreciated that by moving the lift handle 48 downwardly in the direction of arrow A, cams 50 engage the associated cam surface 52 of the rear hook members 40 to move the hook members 40 and latch plates 41 to an inoperative position, removed from engagement with the anchor members 20. The lift handle 48 is typically actuated at the rear of the vehicle seat 10.

In certain types of vehicles, for examples, vans or the like, it is desirable that the rear hook members 40 be moved to their inoperative position at the side of the vehicle seat 10. This is particularly desirable when the vehicle has a side door such that access may be readily available to the side portion of the vehicle seat 10. Thus, in accordance with the principles of the present invention, the actuating mechanism includes handle structure, generally indicated at 54, coupled to at least one end of the lift handle 48 and associated with a rear leg 30. The handle structure 54 extends outwardly from the side 35 of the associated rigid support structure 22 (FIG. 1).

In the illustrated embodiment, the vehicle seat includes a handle structure 54 associated with each rear leg 30 so that the rear hook members can be latched and unlatched at either side of the vehicle seat. FIG. 1 shows the handle structure 54 mounted with respect to the left side of the seat while FIGS. 2–4 show a handle structure 54 mounted with respect to the right side of the seat 10. However, it can be appreciated that only one handle structure may be provided if desired.

Figure 5:
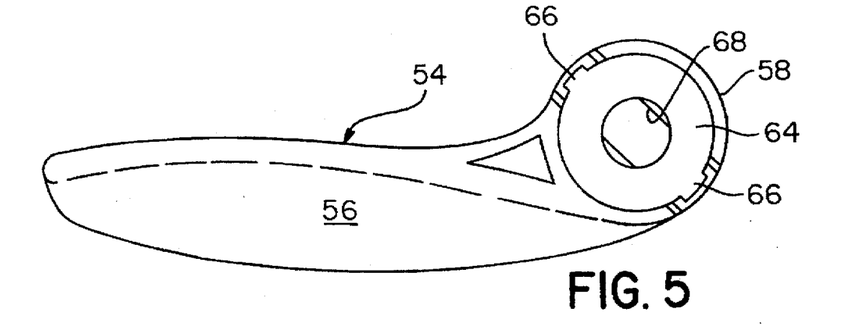
FIG. 5 is a rear view of the handle structure provided in accordance with the present invention.
Figure 6:
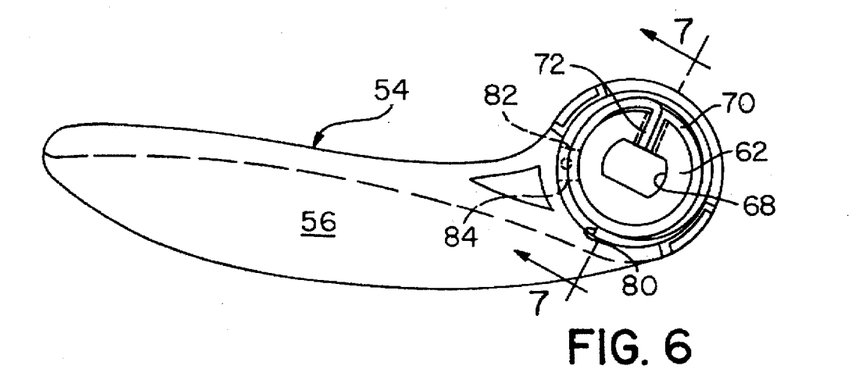
FIG. 6 is a view similar to FIG. 5, but shown with a cover of the handle structure removed.

As shown in FIG. 5, each handle structure 54, preferably made of plastic, includes a housing defining a manually engageable portion 56 and a mounting portion 58. The mounting portion 58 includes an annular recess 60. A coupling member 62 is mounted for pivotal movement in the recess 60. A cover member 64 covers the coupling member 62 and the recess 60. As shown in FIG. 5, the cover member 64 is snap-fitted with the mounting portion 58 via tabs 66. FIG. 6 shows a handle structure 54 with the cover member 64 removed.

Figure 7:
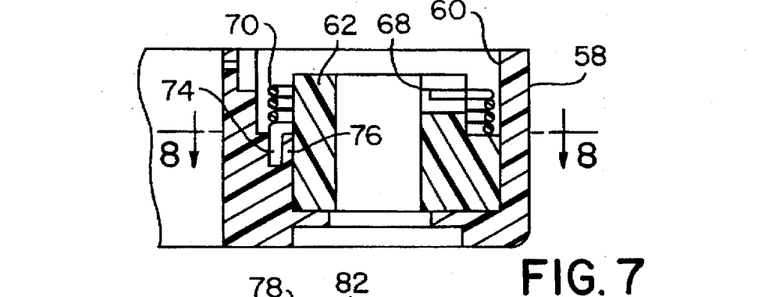
FIG. 7 is a sectional view taken along the line 7—7 of FIG. 6.

The coupling member 62 includes a bore 68 for receiving an end of the lift handle 48. Thus, the coupling member 62 is fixedly coupled to the end of the lift handle 48, thereby coupling the handle structure 54 to the lift handle 48. With reference to FIGS. 6 and 7, the coupling member 62 may be of plastic material or, if additional strength is required, may be metal. A torsional spring 70 is provided about the coupling member 62 and is fixed at one end 72 thereof to the coupling member 62 while the other end 74 of the spring 70 is fixed to a boss 76 extending into the recess 60, the function of which will become apparent below.

Figure 8:
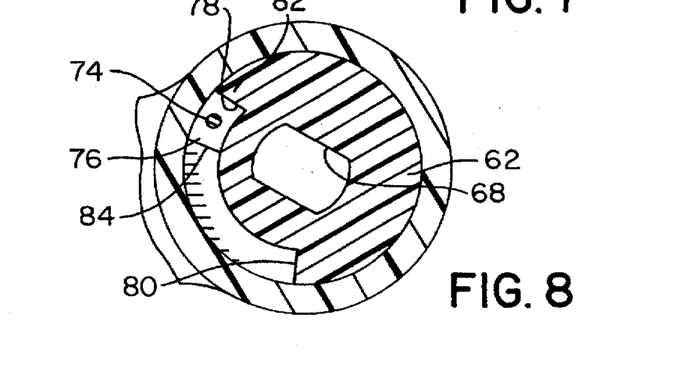
FIG. 8 is a sectional view taken along the line 8—8 of FIG. 7.

As shown in FIG. 8, the coupling member 62 includes a pair of spaced, stop surfaces 78 and 80, respectively. In addition, the boss 76 defines a pair of stop surfaces 82 and 84. In a normal, use position, the torsion spring 70 biases the coupling member 62 so that surface 78 thereof engages the stop surface 82 of the boss 76. In the use position, the engageable portion 56 of the handle structure 54 is oriented as shown in FIGS. 1 and 2 so as to be easily grasped and manually moved upwardly. Since the handle structure 54 is coupled to the lift handle, upward movement of the handle structure 56 from its use position in FIG. 2 to an uplifted position, as shown in FIG. 3, will cause the rear hook members 40 and latch plates 41 to be released from engagement with the anchor members 20. Thus, since the handle structure 54 is coupled with the lift handle 48, upward movement of the handle structure 54 results in movement of the rear hook members 40 and latch plates 41 to the inoperative position thereof, released from engagement with the anchor members 20.

Once the rear hook members 40 and latch plates 41 are released, the seat 10 may be tumbled forwardly about the axis of the front anchor members 18 to a storage position thereof. This occurs since front hook members 86 are in their operative position, engaged with the anchor members 18 with a downwardly facing surface 88 of the front legs 90 in contact with the front anchor members 18.

With reference to FIG. 1 and as noted above, each of the rigid support structures 22 and 23 includes a front leg 90 pivotally coupled thereto at pin 92. Each of the front legs 90 includes a front hook member 86 mounted for pivotal movement between an operative position so as to enter the associated front well 14 and engage in hooked relationship with the associated front anchor member 18, and an inoperative position released from engagement with the anchor member 18. Thus, when the rear hook members 40 and the front hook members 86 are in their operative positions thereof, the rigid support structures and hence the cushioned seat structure thereon are fixed in an operative position on the floor 12 with the anchor members 18 and 20 and the downwardly facing surface 88 and 38, respectively, in engagement. The front hook members 86 and thus the front legs 90 are coupled together in the conventional manner via an actuating rod (not shown).

As shown in FIG. 1, a tie bar 94 has one end coupled to a cam member 96 with the other, slotted end 97 thereof coupled to the rear leg 30 via post 99. Post 99 is fixed to the rear leg 30. A spring 100 biases the post 99 toward the front portion of a slot 102. The post 99 may slide within the slot 102 of the slotted end 99 to provide an adjustment when the seat 10 is moved to its operative position. The cam member 96 is pivotally coupled to the front leg 90. This linkage structure permits the rear legs 30 to fold forwardly towards the top surface 34 of the associated rigid support structure as the seat 10 is tumbled forwardly to the storage position thereof. This occurs in the conventional manner as disclosed, for example, in U.S. Pat. No. 4,700,989, the disclosure of which is incorporated into the present specification by this reference. In particular, since at least one of the rear legs 30 is hinged to the rear end of the tie bar 94 and the rear legs 30 are hinged to the associated rigid support structure, during the forward tumbling of the seat, the tie bar 94 is actuated by the cam member 96, urging the rear legs 40 to the forwardly folded position thereof as shown in FIG. 4.

With reference to the Figures, it can be appreciated that as the rear legs 30 are moved to the forwardly folded position thereof, an end portion of the handle structure 54 will contact the upper surface 34 of the associated rigid support structure. Surface 34 extends outwardly and generally transversely from side surface 35 (FIG. 1) of each rigid support structure 22 and 23. Such contact would normally restrict further folding movement of the rear legs 30. However, in accordance with the principles of the present invention, the handle structure 54 includes a lost-motion connection. The lost-motion connection permits the coupling member 62 to move against the bias of the spring 70, enabling further or continued movement of the rear legs 30 to the forwardly folded position thereof, as shown in FIG. 4. Thus, as the rear legs 30 are folding, the lost-motion connection permits the end portion of the handle structure 54 to slide along the top surface 34, without hindering the movement of the rear legs 30.

With reference to FIGS. 4 and 8, the lost-motion connection is defined by the cooperation of the boss 74 with the coupling member 62 of the handle structure 54. As the end portion of the handle structure 54 contacts the upper surface 34 of the rigid support structure, the coupling member 62 will rotate against the bias of the spring 70 until stop surface 80 thereof engages the surface 84 of the boss 76, providing the lost-motion feature.

It can be appreciated that the lost-motion connection of the handle structure 54 of the invention can be utilized with various vehicle seat configurations.

To remove the vehicle seat 10 completely from the vehicle, the front hook members 86 are released in the conventional manner by actuating an actuating rod (not shown) operatively associated with the front hook members, and lifting the seat from the vehicle.

The vehicle seat 10 may be employed as a passenger seat such as a front and/or rear passenger seat. Thus, the seat 10 may be adjustable fore and aft as, for example, disclosed in U.S. application Ser. No. 08/527,727, or any similar construction or may be a six-way adjustable seat as disclosed, for example, in U.S. application Ser. No. 08/341,222. The disclosures of the above-referenced applications are hereby incorporated into the present specification by this reference.

It can be seen that the present invention provides a simple and effective means of releasing rear hook members from their latched position by actuating handle structure disposed at a side of the vehicle seat while ensuring that the handle structure does not prevent the rear legs from moving to a forwardly folded position when the vehicle seat is tumbled forwardly to a storage position.

It thus will be appreciated that the objects of this invention have been fully and effectively accomplished. It will be realized, however, that the foregoing preferred embodiment the present invention has been shown and described for the purpose of illustrating the structural and functional principles of the present invention and is subject to change without departure from such principles. Therefore, this invention includes all the modifications encompassed within the spirit of the following claims.

What is claimed is:

1. A vehicle seat for use in a vehicle including floor means having a pair of front and rear wells disposed with respect to a longitudinal axis of the vehicle and anchor members extending across said wells, said seat being constructed and arranged to be movable between an operative position for receiving a passenger thereon and forwardly tumbled, storage position, said vehicle seat comprising:

a pair of rigid support structures disposed on opposite sides of said vehicle seat, a cushioned seat structure on said pair of rigid support structures, front and rear legs mounted on each of said rigid support structures, each of said legs including a downwardly facing surface for engaging the anchor members, and associated front and rear hook members, each of said front and rear hook members being mounted for movement between (1) an operative position so as to enter the associated front and rear wells and engage in hooked relationship with the anchor members so as to detachably retain the rigid support structures in a fixed, operative position on the floor means with the anchor members and the downwardly facing surfaces in engagement and (2) an inoperative position removed from engagement with the anchor members, each of said rear legs being pivotally coupled to an associated rigid support structure so as to be movable between (1) an operative position extending generally downwardly with respect to an associated rigid support structure permitting said rear hook members to be disposed in the operative position thereof, and (2) a forwardly folded position disposed generally adjacent an associated rigid support structure, and an actuating mechanism operatively associated with said rear hook members and including manually movable handle structure associated with at least one of said rear legs in a position to be manually grasped and operated at a side of said vehicle seat, said handle structure being biased toward a use position by a spring system, said actuating mechanism being constructed and arranged with respect to said rear hook members so that manual movement of said handle structure from said use position moves said rear hook members from their operative position to their inoperative position thereby permitting said vehicle seat to be pivoted about said front anchor members, disposed in the operative position thereof, and moved to the forwardly tumbled, storage position thereof, said handle structure including a lost-motion connection constructed and arranged such that when said rear legs move toward their forwardly folded position causing a portion of said handle structure to contact a surface of an associated rigid support which would otherwise restrict movement of said rear legs, said lost-motion connection permits said handle structure to move against the bias thereon, enabling said rear legs to complete movement to their forwardly folded position thereof.

2. The vehicle seat according to claim 1, wherein said actuating mechanism includes a lift bar disposed between said rigid support structures and pivotally coupled to each of said rear legs, said lift bar being operatively associated with said rear hook members such that movement of said lift bar to an operative position moves said rear hook members from said operative position thereof to said inoperative position thereof, said handle structure being coupled to at least one end of said lift bar so as to extend outwardly from a side of an associated rigid support structure, whereby movement of said handle structure from its use position moves said lift bar to its operative position thereby moving the rear hook members to the inoperative position thereof.

3. The vehicle seat according to claim 2, wherein said lift bar includes a cam fixed at each end thereof, each said cam cooperating with a cam surface of an associated said rear hook member when said lift bar is moved to its operative position, which causes the rear hook members to move to the inoperative position thereof.

4. The vehicle seat according to claim 2, wherein said handle structure includes a housing defining an engageable portion and a mounting portion, and a coupling member mounted for movement within a recess defined in said mounting portion, said coupling member being fixed at one portion thereof to said one end of said lift bar, said spring system including a torsion spring having one end coupled to said housing and the other end thereof coupled to said coupling member so that the torsion spring biases said coupling member and thus said handle structure to the use position thereof, said housing including a boss extending into said recess so as to define first and second opposing stop surfaces, said coupling member including first and second stop surfaces disposed in spaced relation such that when said handle structure is in said use position, said first stop surface of said coupling member is engaged with said first stop surface of said boss, said lost-motion connection being defined by cooperation of said boss with said coupling member so that when said handle portion contacts said surface of the rigid support structure, said coupling member rotates with respect to said housing against the bias of said torsion spring until said second stop surface of said coupling member engages said second stop surface of said boss, which allows said rear legs to move to the forwardly folded position thereof.

5. The vehicle seat according to claim 4, wherein one said handle structure is coupled to each end of said lift bar.

6. The vehicle seat according to claim 1, further comprising linkage structure coupling said front legs to said rear legs, said linkage structure being constructed and arranged such that upon movement of said vehicle seat to its forwardly tumbled, storage position, said linkage actuates said rear legs to move said rear legs to their forwardly folded positions.

7. A frame structure for supporting a cushioned seat structure of a vehicle seat for use in a vehicle including floor means, said floor means having a pair of front and rear wells disposed with respect to a longitudinal axis of the vehicle and anchor members extending across said wells, said frame structure being constructed and arranged to be movable between an operative position on said floor means and a forwardly tumbled, storage position, said frame structure comprising:

a pair of rigid support structures constructed and arranged to be mounted to said seat structure on opposing sides thereof, front and rear legs mounted on each of said pair of rigid support structures, each of said legs including a downwardly facing surface for engaging the anchor members, and associated front and rear hook members, each of said front and rear hook members being mounted for movement between (1) an operative position so as to enter the associated front and rear wells and engage in hooked relationship with the anchor members so as to detachably retain the rigid support structures in a fixed operative position on the floor means with the anchor members and the downwardly facing surfaces in engagement and (2) an inoperative position removed from engagement with the anchor members, each of said rear legs being pivotally coupled to an associated rigid support structure so as to be movable between (1) an operative position extending generally downwardly with respect to an associated rigid support structure with said rear hook members disposed in their operative positions, and (2) a forwardly folded position disposed generally adjacent an associated rigid support structure, and an actuating mechanism including manually movable handle structure associated with at least one of said rear legs in a position to be manually grasped and operated at a side of said vehicle seat, said handle structure being biased toward a use position by a spring system, said actuating mechanism being constructed and arranged with respect to said rear hook members so that manual movement of said handle structure from said use position moves said rear hook members from the operative position thereof to the inoperative position thereof thereby permitting said frame structure and the seat structure when mounted thereon to be pivoted about said front anchor members, disposed in the operative position thereof, and moved to the forwardly tumbled, storage position thereof, said handle structure including a lost-motion connection constructed and arranged such that when said rear legs move toward the forwardly folded position thereof causing a portion of said handle structure to contact a surface of an associated rigid support which would otherwise restrict movement of said rear legs, said lost-motion connection permits said handle structure to move against the bias thereon, enabling said rear legs to complete movement to the forwardly folded position thereof.

8. The vehicle seat according to claim 7, wherein said actuating mechanism includes a lift bar disposed between said rigid support structures and pivotally coupled to each of said rear legs, said lift bar being operatively associated with said rear hook members such that movement of said lift bar to an operative position moves said rear hook members from said operative position thereof to said inoperative position thereof, said handle structure being coupled to at least one end of said lift bar so as to extend outwardly from a side of an associated rigid support structure, whereby movement of said handle structure from its use position moves said lift bar to its operative position thereby moving the rear hook members to the inoperative position thereof.

9. The vehicle seat according to claim 8, wherein said lift bar includes a cam fixed at each end thereof, each said cam cooperating with a cam surface of an associated said rear hook member when said lift bar is moved to its operative position, which causes the rear hook members to move to the inoperative position thereof.

10. The vehicle seat according to claim 8, wherein said handle structure includes a housing defining an engageable portion and a mounting portion, and a coupling member mounted for movement within a recess defined in said mounting portion, said coupling member being fixed at one portion thereof to said one end of said lift bar, said spring system including a torsion spring having one end coupled to said housing and the other end thereof coupled to said coupling member so that the torsion spring biases said coupling member and thus said handle structure to the use position thereof, said housing including a boss extending into said recess so as to define first and second opposing stop surfaces, said coupling member including first and second stop surfaces disposed in spaced relation such that when said handle structure is in said use position, said first stop surface of said coupling member is engaged with said first stop surface of said boss, said lost-motion connection being defined by cooperation of said boss with said coupling member so that when said handle portion contacts said surface of the rigid support structure, said coupling member rotates with respect to said housing against the bias of said torsion spring until said second stop surface of said coupling member engages said second stop surface of said boss, which allows said rear legs to move to the forwardly folded position thereof.

11. The vehicle seat according to claim 10, wherein one said handle structure is coupled to each end of said lift bar.

12. The vehicle seat according to claim 7, further comprising linkage structure coupling said front legs to said rear legs, said linkage structure being constructed and arranged such that upon movement of said vehicle seat to its forwardly tumbled, storage position, said linkage actuates said rear legs to move said rear legs to their forwardly folded positions.

* * * * *